(12) United States Patent
Hough et al.

(10) Patent No.: US 6,281,600 B1
(45) Date of Patent: Aug. 28, 2001

(54) JUMP START SYSTEM FOR VEHICLES HAVING DIFFERENT OPERATING VOLTAGES

(75) Inventors: Barry Michael Hough, Beaver Dam; Jim Milton Shoemaker, Horicon, both of WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/346,092

(22) Filed: Jul. 1, 1999

(51) Int. Cl.[7] ....................................... H02J 7/00
(52) U.S. Cl. ..................... 307/10.7; 307/10.6; 320/104; 320/105
(58) Field of Search ................. 307/10.6, 10.7, 307/10.8, 9.1; 320/104, 105, 100

(56) References Cited

U.S. PATENT DOCUMENTS

| | | | |
|---|---|---|---|
| 4,233,552 | 11/1980 | Baumbach | 320/7 |
| 4,286,172 | 8/1981 | Millonzi et al. | 307/10 R |
| 4,701,688 | 10/1987 | Guim | 320/25 |
| 4,769,586 | * 9/1988 | Kazmierowicz | 320/105 |
| 4,999,562 | 3/1991 | Hill | 320/7 |
| 5,162,720 | * 11/1992 | Lambert | 320/104 |
| 5,563,454 | * 10/1996 | Araki et al. | 307/10.6 |
| 5,838,136 | * 11/1998 | Waugh | 320/106 |

* cited by examiner

Primary Examiner—Albert W. Paladini

(57) ABSTRACT

Jump start structure and method particularly useful for a battery-start vehicle for starting the vehicle or quick charging the battery from a separate source which may have an operating voltage substantially higher than the battery voltage. A starting system operating at a first voltage, for example twelve volts, is connected to a separate source of higher voltage, such as twenty-four volts, through a jumper cable. In one embodiment, a manual switch on the vehicle with the discharged battery must be operated simultaneously with the key switch to start the engine. In another embodiment, an inexpensive control circuit including a normally closed relay located on the vehicle connects the separate source with the discharged battery when a jumper cable from the source is plugged into the vehicle. Once the discharged battery receives sufficient charge, the relay activates to open the circuit between the separate source and the vehicle battery. The normally closed relay facilitates use of the vehicle for jump starting another vehicle.

22 Claims, 3 Drawing Sheets

JUMP START SYSTEM FOR VEHICLES HAVING DIFFERENT OPERATING VOLTAGES

BACKGROUND OF THE INVENTION

1) Field of the Invention

The present invention relates generally to battery operated starting systems, and, more specifically, to circuitry for jump starting a vehicle having an electrical system of one voltage, typically twelve volts, with another vehicle having an electrical system with a system which may have a substantially higher voltage, such as twenty-four volts.

2) Related Art

Utility vehicles and similar consumer oriented products typically have a nominal twelve volt system for starting, running and accessory operation. If the battery discharges to a level below that necessary for starting, a jump starting procedure is employed using another vehicle or portable device to provide sufficient starting power to the disabled vehicle. In many situations, the assisting device has the same nominal voltage as the disabled vehicle so a direct battery-to-battery connection can be made simply. However, the starting device may have a substantially higher voltage than the disabled vehicle, such as is the situation when a vehicle with a twelve volt system is operated among military vehicles which usually have twenty-four volt systems. If the jumper cables between the twelve volt system and the twenty-four volt system remain connected too long, battery or vehicle component damage or wiring damage can occur. Disconnecting the cable too soon prevents the discharged battery from receiving enough charge for restarting the engine if for any reason there is a shut-down shortly after the jump start.

Some jump start systems have control devices associated directly with the cables or with the jump vehicle. Other systems include expensive DC to DC converters. Such devices add substantial cost and complexity to a system and, in operations such as the military where most all vehicles operate at twenty-four volts, equipping all jump start systems with protective circuitry or DC to DC converters that are only necessary with a relative few twelve-volt systems would not be practical or cost-effective.

BRIEF SUMMARY OF THE INVENTION

It is therefore an object of the present invention to provide an improved method and circuit for jump starting a vehicle having an electrical system of a first voltage with another vehicle or other portable device having a substantially higher output voltage. It is another object to provide such a method and circuit which overcomes most or all of the aforementioned problems.

It is a further object of the present invention to provide an improved method and circuit for jump starting a vehicle or quickly charging a vehicle battery wherein the jump start vehicle or device has a substantially higher voltage than the nominal operating voltage of the vehicle being jumped. It is another object to provide such a method and circuit which is relatively simple and inexpensive and which obviates DC to DC converters and other costly and complicated circuitry. It is still another object to provide such a circuit which also permits a jump starting procedure between two vehicles having the same nominal operating voltage.

It is yet another object of the invention to provide an improved method and circuit for jump starting a vehicle including an operator control mounted on the vehicle which is being jumped. It is a further object to provide such a method and circuit which simply and inexpensively reduces the possibility of battery, component and wiring damage when a system of a preselected first voltage is used to jump start a vehicle having an electrical system with operating voltage substantially greater than the first voltage. It is a further object to provide a starting system that is simple and convenient to use and which does not require jumper cables with built-in electronic controls.

A starting system operating at a first voltage, for example twelve volts, is connected to a separate source of higher voltage, such as twenty-four volts, through a jumper cable. In one embodiment, a manual switch on the vehicle with the discharged battery must be operated simultaneously with the key switch to start the engine from the separate source. Since the operator must manually activate a switch for quick charging the battery, the possibility of damage caused by overcharging is substantially reduced. If the operator desires to start the vehicle using the alternate higher voltage device as a booster, he must simultaneously operate two offset switches. Therefore there is less likelihood of damage resulting from inadvertently operating the starter too long from the higher voltage device.

In another embodiment, an inexpensive circuit including a normally closed relay located on the vehicle connects the separate source with the discharged battery when a jumper cable from the source is plugged into a jump start connector on the vehicle. Once the discharged battery receives sufficient charge, or if the circuit detects excessive boost start times or over-voltage charging, the circuit activates the relay to open the circuit between the separate source and the vehicle battery. The normally closed relay facilitates use of the vehicle for charging and/or providing a boost for starting another vehicle. The circuit includes a simple microcontroller without analog-to-digital converters to reduce complexity and cost.

These and other objects, features and advantages of the present invention will become apparent to one skilled in the art upon reading the following detailed description in view of the drawings.

DETAILED DESCRIPTION OF THE DRAWING

Figure 1:
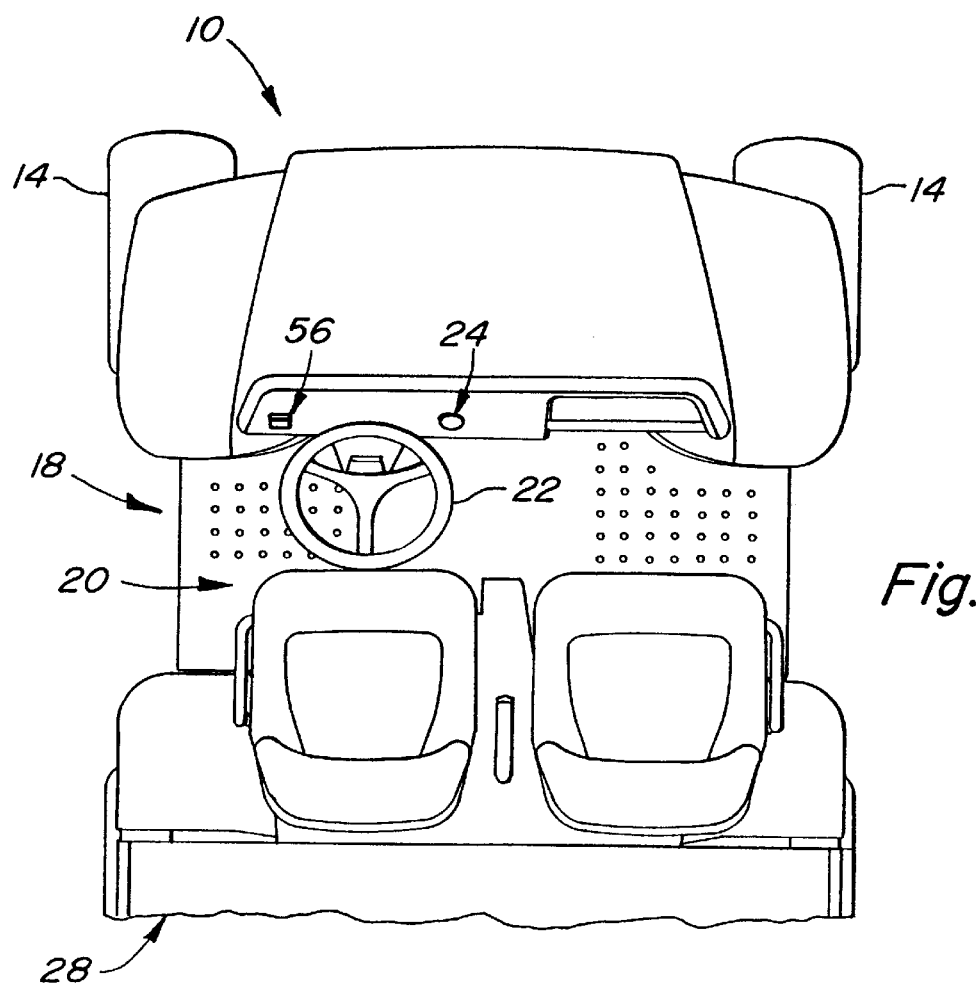
FIG. 1 is a top view of a portion of a vehicle having a battery operated starting system with a jump start structure mounted on the vehicle.
Figure 4:
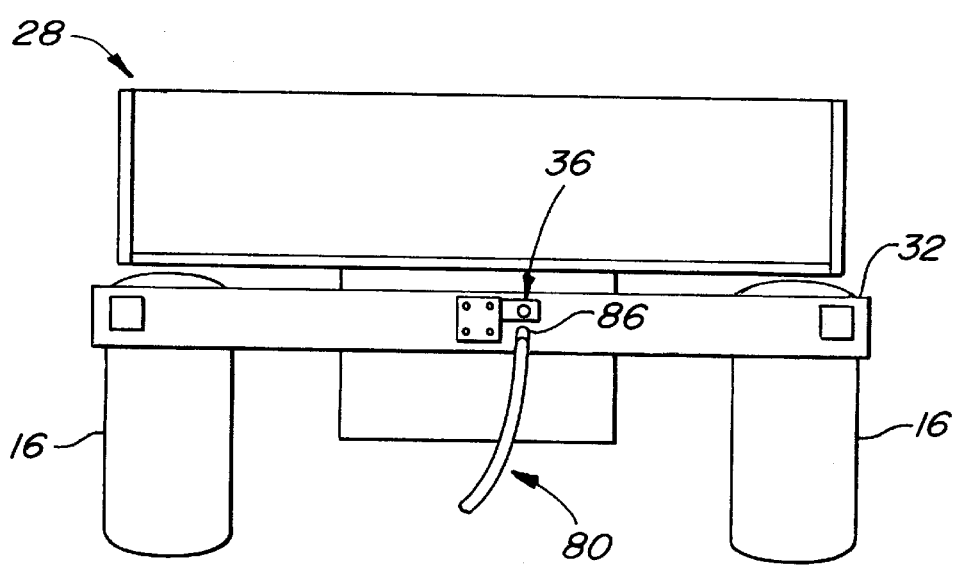
FIG. 4 is a rear view of the vehicle of FIG. 1.

Referring now to FIG. 1 therein is shown a vehicle 10 having a frame 12 supported for movement over the ground by front steerable wheels 14 and rear drive wheels 16. An operator station indicated generally at 18 with operator seating area 20 is located on the vehicle and includes conventional controls such as a steering mechanism 22 operably connected to the wheels 14 and an instrument panel having a starter switch 24 connected to an engine starting circuit indicated generally at 26 in FIGS. 2 and 3. The vehicle 10 as shown in FIG. 1 includes a rear cargo area 28 behind the seating area 20 and rear frame area 32 (FIG. 4) below the cargo area.

Figure 2:
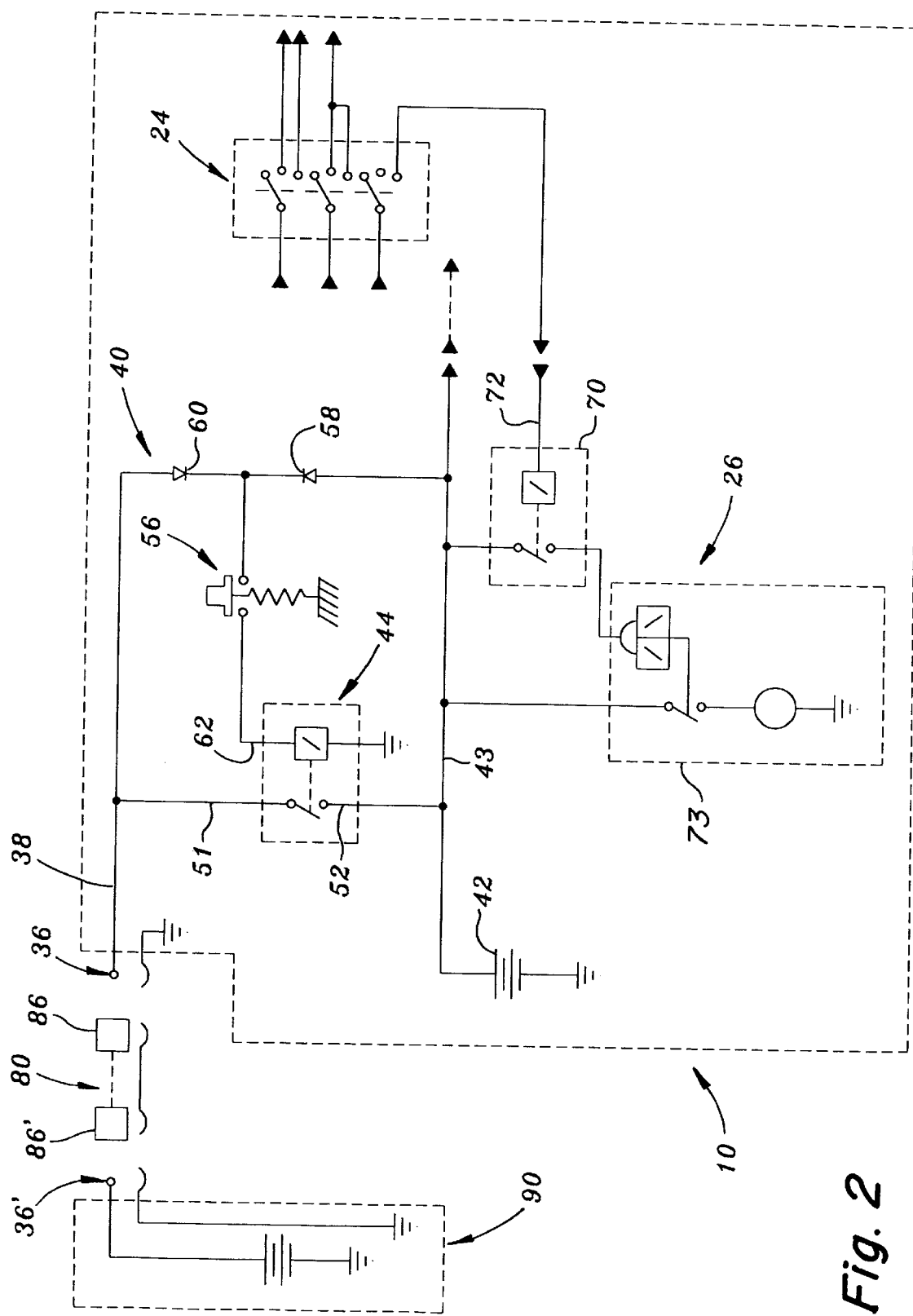
FIG. 2 is a schematic of a jump start structure for the vehicle of FIG. 1 with a manual control.

A jump start connector 36 (FIG. 4) is mounted on the rear frame area 32 and connected through a line 38 and a jump start circuit 40 (FIG. 2) to the circuit 26. The circuit 40 includes a vehicle battery 42 connected via power line 43 to a relay 44 which is controlled by the circuit 40. The relay 44 is normally open and includes a first switched terminal 51 connected to the line 38 and a second switched terminal 52 connected to the positive terminal of the battery 42. As shown in FIG. 2, the circuit 40 includes a normally open manual operator switch 56 mounted at the operator station 18 on the instrument panel on the side of the steering mechanism 22 opposite the switch 24. The input to the switch 56 is connected via diode 58 to the positive terminal of the battery 42 and via diode 60 to the line 38. The output of the switch 56 is connected to a control terminal 62 of the relay. When the switch 56 is depressed and held by the operator, the relay 44 will activate to close the circuit between the line 38 and the battery 42 and starting circuit 26, if power is supplied to the switch input from either the battery 42 or a separate source of power provided through the connector 36 and the line 38.

The starting circuit 26 includes a starter relay 70 connected to a conventional starter 73 on the vehicle 10. The relay 70 includes a control terminal 72 connected to the starter switch 24 on the vehicle instrument panel. Moving the switch 24 to the lowermost start position closes the circuit between the power line 43 and control terminal 72 to close the relay 70 and power the starter 73 from the line 43.

As shown in FIG. 2, an elongated jumper cable 80 includes a first connector 86 adapted for mating with the jump start connector 36 on the vehicle 10. The opposite end of the cable 80 includes a generally identical connector 86' adapted for connection to connector 36' on an alternate supply of power indicated generally at 90.

The alternate supply 90 may be another vehicle generally identical to the vehicle 10 with an identical operating voltage, jump start connector 36 and jump start circuit 40. For example, if two generally identical utility vehicles having nominal 12 volt systems with the system described above are operating in the same area, and one of the vehicles has a discharged battery, the operational vehicle simply is positioned next to the disabled vehicle and the jump start cable 80 is attached to the connectors 36 and 36'. Both operators then depress their respective jump start switches 56 to close the connection between the good source and the discharged battery to quickly provide a surface charge on the low battery. The operator in the disabled vehicle can also engage the starter on the vehicle by operating both the switches 24 and 56 simultaneously while the other operator depresses the other jump start switch. Once the disabled vehicle is charged or started using the jump start system, the operators release the jump start buttons 56 and disconnect the cable 80 from the vehicles.

The supply 90 may also be a different vehicle or generating device having an electrical system of higher output voltage than the vehicle 10. The cable 80 from the device 90 is attached to the connector 36 to power the line 38 with the relatively high voltage. The operator then depresses the jump start switch 56 on the vehicle 10 to close the relay 44 and connect the device with the discharged or disabled battery 42 via line 43. By holding the switch 56 closed, the battery 42 can be charged with the higher voltage device. Since the operator must keep the switch 56 depressed for the charging action, the possibility of damage caused by overcharging is substantially reduced. If the operator desires to start the vehicle from the alternate higher voltage device 90, he must simultaneously operate the switches 24 and 56. Since positive action in the form of simultaneous operation of the offset switches using both hands is required on the part of the operator, there is less likelihood of damage resulting from inadvertently operating the starter too long from the higher voltage device.

Figure 3:
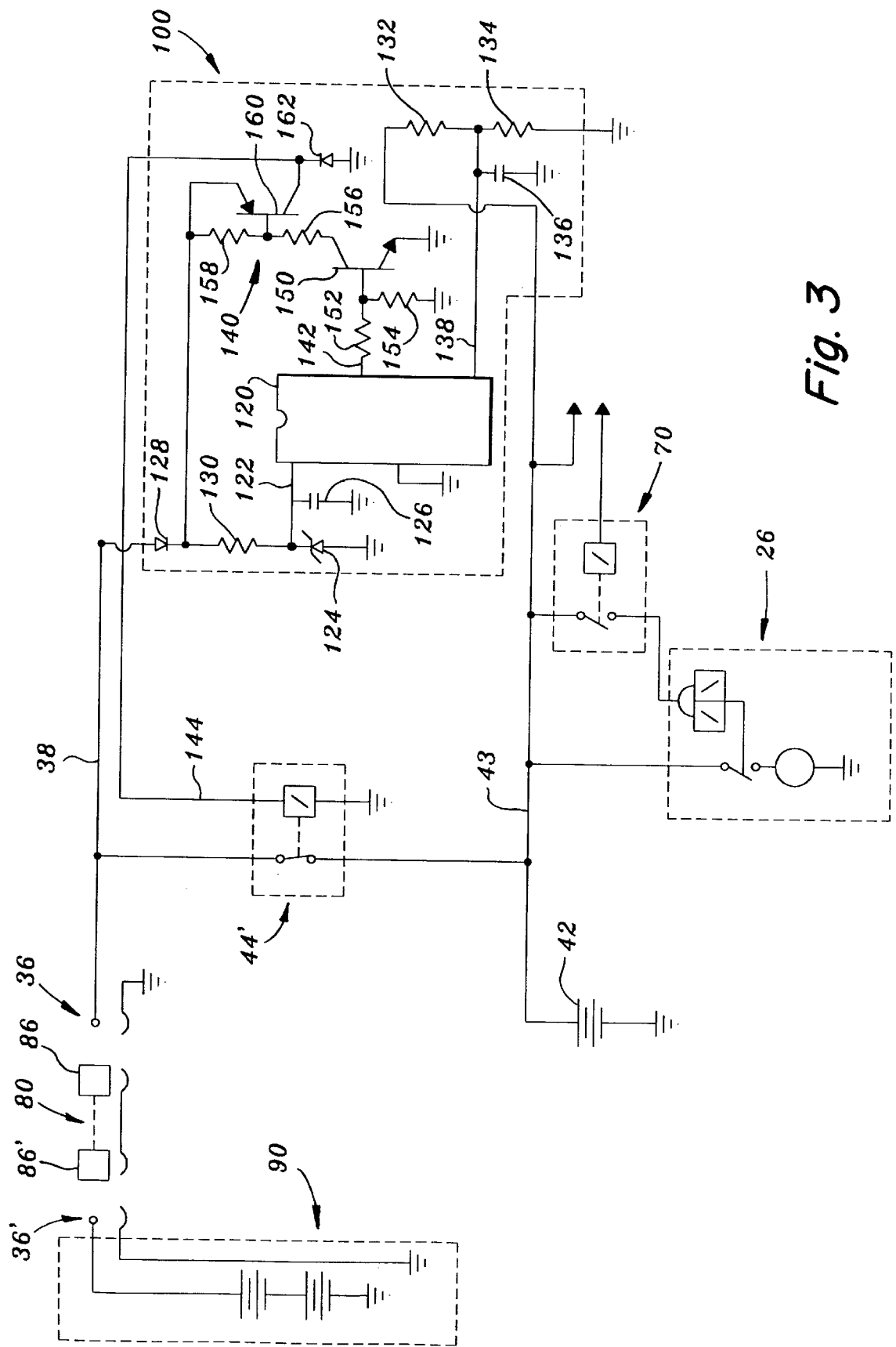
FIG. 3 is a schematic similar to that of FIG. 2 but showing a circuit having an automatic control.

In the alternate embodiment of FIG. 3, the jump start circuit 40' includes a normally closed relay or switch 44' located on the vehicle 10 and connected to a jump start controller 100, also located on the vehicle 10. The controller 100 senses the voltage at the battery 42, the charge acceptance of the battery 42, the amount of time over-charge voltage has been applied, the number of closings of the relay 44', and whether or not vehicle starting is attempted. Based on the conditions sensed, the controller opens the relay 44' to prevent overcharging and damage to the electrical system of the vehicle 10. Since the relay 44' is normally closed, use of the vehicle 10 to jump start or provide battery boost to another vehicle is facilitated. The operator simply plugs in a jump cable 80 to the connector 36 and connects the cable to the electrical system of the disabled vehicle (10).

The circuit 40' includes a microcontroller 120 powered through a terminal 122 connected to a controlled voltage source including a zener diode 124 and capacitor 126. A reverse polarity protection diode 128 and a current limiting resistor 130 connect the terminal to the line 38. The zener diode 124 limits the voltage at 122 to approximately 5 volts (Vcc). A voltage divider including resistors 132 and 134 and capacitor 136 is connected to a sensing terminal 138 of the microcontroller 120 and to the line 43 to provide a signal to the microcontroller indicative of the voltage level at the vehicle battery 42.

A relay driver 140 is connected to an output terminal 142 and to control input 144 of the relay 44'. The driver 140 includes an NPN transistor 150 having a grounded emitter and a base connected through a resistor 152 to the output terminal 142 and through a resistor 154 to ground. The collector of the transistor 150 is connected through resistors 156 and 158 to the power line 38 via diode 128. A PNP transistor 160 includes a collector connected to ground through a diode 162 and to the control input 144. The emitter is connected to the power line via diode 128.

Selected terminals of the microcontroller 120 can be configured as either an input or an output. The terminal 138 is first configured as an output and grounded to fully discharge the capacitor 136. Thereafter, the terminal 138 is configured as an input, which allows the capacitor 136 to start charging. The rate of charge is determined by the voltage at the battery 42. The microcontroller 120 monitors the time required for the capacitor 136 to charge to a threshold voltage which preferably is a half of Vcc, or about 2.5 volts. Based on the time to reach the threshold voltage, the microcontroller calculates the voltage applied to the RC circuit 132,134 and 136. The cycle is then repeated with the microcontroller reconfiguring the terminal 138 as an output, grounding the terminal and discharging the capacitor 136. This method of voltage determination facilitates use of an inexpensive microcontroller without analog to digital converters.

When the time required to charge the capacitor to the threshold level is indicative of a voltage level of a charged battery, the microcontroller changes the output terminal 142 from a low to a high or on condition which turns on the transistors 150 and 160 and activates the relay 44' to open the circuit between the alternate voltage supply and the battery 42. Over-voltage protection is thus provided.

If the voltage at the battery 42 drops, for example, when the starter 26 is engaged, the microcontroller sets the terminal 142 low to turn off the transistors 150 and 160 and close the relay 44' to provide battery charging and/or starter boost. The number of times the relay 44' is cycled and the timing of the cycles is monitored by the microcontroller 120 to provide an indication of the charge accumulation on the battery 42, the amount of time the starter has been activated and the number of cycles of starter operation with the alternate voltage device 90. A separate terminal of the controller 120 may also be connected to the starter terminal of the switch 24 to monitor actual starter boost time. If the boost time is too long or if an excessive number of boosted starter cycles are detected for a given period of time, the controller will open the relay 44'. Rapid relay cycling can indicate that the battery 42 is defective.

By way of example only, the following components have been found to provide good system operation:

| Component | Reference #: | Value: |
|---|---|---|
| Resistors | 130 & 156 | 12 k |
| | 132 & 134 | 10 k |
| | 152 & 154 | 10 k |
| | 158 | 10 k |
| Capacitors: | 126 | 47 uf |
| | 136 | 0.1 uf |
| Microcontroller | 120 | PIC12C508 |

Having described the preferred embodiment, it will become apparent that various modifications can be made without departing from the scope of the invention as defined in the accompanying claims.

What is claimed is:

1. A starting system for a vehicle having a station for an operator, an engine with an electric starter, a battery with a nominal voltage level, a first operator controlled switch located on the vehicle adjacent the station and selectively connecting the battery with the starter for starting the engine, and jump start structure for starting the engine from an alternate voltage supply, the jump start structure including a line connected to the alternate voltage supply, a second controlled switch supported by the vehicle, wherein both the first and second controlled switches must be operated during overlapping periods of time to close a starting circuit path between the alternate voltage supply and power the electric starter from the alternate voltage supply during the overlapping periods of time.

2. The starting system as set forth in claim 1 wherein the alternate voltage supply has a voltage level substantially greater than the nominal voltage level, the controlled switches facilitating limited operation of the electric starter with the alternate voltage supply to prevent damage to the starting system as a result of prolonged operation at a voltage above the nominal voltage.

3. The starting system as set forth in claim 1 wherein the jump start system includes a plug arrangement supported on the vehicle, cable structure connected to the alternate voltage supply and selectively connectable to the plug arrangement, and wherein the second controlled switch is connected between the electric starter and the plug arrangement.

4. The starting system as set forth in claim 1 wherein the alternate voltage supply comprises a second vehicle having a nominal twenty-four volt electrical system, and wherein the nominal voltage level is twelve volts, and wherein the second controlled switch selectively connects the alternate voltage supply with the battery to provide charging of the battery.

5. The starting system as set forth in claim 1 wherein the second controlled switch comprises a normally closed relay connecting the alternate voltage supply to the battery and a control circuit connected to the relay and to the battery and responsive to battery voltage to selectively open the relay.

6. The starting system as set forth in claim 5 wherein the control circuit includes a microcontroller having a terminal configurable as either an input or an output, and an RC circuit connected to the battery and to the terminal, the microcontroller determining the voltage at the battery based on the time required for the terminal to reach a threshold voltage.

7. The starting system as set forth in claim 1 wherein the second controlled switch comprises a manual operator controlled switch supported on the vehicle at a location offset from the first operator controlled switch, wherein the operator must manually and simultaneously operate both the first and second controlled switches to power the electric starter from the alternate voltage supply.

8. The starting system as set forth in claim 7 wherein the vehicle includes a steering mechanism adjacent the operator station and the first and second controlled switches are located on opposite sides of the steering mechanism so that the operator must use both hands to operate both the switches simultaneously.

9. The starting system as set forth in claim 1 wherein the alternate voltage supply comprises a second vehicle, the second vehicle including a jump start switch, and wherein the jump start switch and the second controlled switch must be activated simultaneously to power the electric starter from the alternate voltage supply.

10. A charging and starting system for a vehicle having an engine with an electric starter, a battery with a nominal voltage level, and jump start structure for supplying power to the battery from an alternate voltage supply separate from the vehicle, the jump start structure including a controlled switch having first and second states and mounted on the vehicle, a jump start line connected to the alternate voltage supply, a connector located on the vehicle and adapted for receiving the jump start line, the controlled switch connecting the alternate voltage supply with the battery when in the first state and disconnecting the alternate voltage supply from the battery when in the second state, a control circuit connected to the controlled switch and responsive to the supplying of power from the alternate voltage supply for changing the state of the controlled switch.

11. The system as set forth in claim 10 wherein the controlled switch is normally in the first state to facilitate use of the connector to provide power from the vehicle.

12. The system as set forth in claim 10 wherein the controlled switch comprises a normally closed relay and the control circuit is responsive to a preselected voltage signal at the battery to open the relay.

13. A method of jump starting a vehicle having a battery operated starter of preselected nominal voltage, the method comprising the steps of:

providing a separate voltage source;

providing a starter switch on the vehicle having a starting position for connecting the battery to the starting system;

supporting a jump start switch on the vehicle connected to the battery and to a jump start terminal, the jump start switch having a jump start position for closing a circuit between the jump start terminal and the starter only when the starter switch is in the starting position;

connecting the jump start terminal to the separate voltage source; and momentarily connecting the separate voltage source to the starter to power the starter by activating the switches so the starter switch is in the starting position while the jump start switch is in the jump start position.

14. The method as set forth in claim 13 wherein the step of providing a voltage source includes providing a voltage source of substantially higher voltage than the nominal voltage and the step of momentarily connecting includes connecting the separate voltage source to the battery.

15. The method as set forth in claim 14 including the step of providing an electronic circuit on the vehicle between the jump start terminal and the battery and limiting the time period that the separate voltage source can be connected to the battery with the electronic circuit.

16. The method as set forth in claim 13 wherein the step of activating the switches comprises manually actuating the starter switch and the jump start switch.

17. The method as set forth in claim 16 wherein the steps of providing a starter switch and supporting a jump start switch include locating the switches at offset locations on the vehicle.

18. The method as set forth in claim 17 wherein the step of locating the switches includes placing them on an operator panel on opposite sides of a steering mechanism.

19. The method as set forth in claim 13 including the step of providing a normally closed relay between the separate voltage source and the battery, the relay activatable to disconnect the separate source to the battery when the voltage at the battery exceeds a preselected level.

20. The method as set forth in claim 19 including the step of sensing the voltage level at the battery and disconnecting the separate voltage source from the battery when the voltage level at the battery reaches a preselected level indicative of a charged battery condition, and further including the step of sensing activation of the starter and automatically closing the relay when the starter is activated to provide booster power to the starter.

21. The method as set forth in claim 20 wherein the step of sensing activation of the starter includes sensing a drop of voltage level at the battery when the starter is activated.

22. The method as set forth in claim 19 including the step of mounting the relay on the vehicle and connecting the relay between the jump start terminal and the battery.

* * * * *